(12) United States Patent
Woods

(10) Patent No.: US 9,408,371 B2
(45) Date of Patent: Aug. 9, 2016

(54) PET TOY DEVICE AND METHOD THEREFOR

(71) Applicant: Pamela Christine Woods, Independence, MO (US)

(72) Inventor: Pamela Christine Woods, Independence, MO (US)

( * ) Notice: Subject to any disclaimer, the term of this patent is extended or adjusted under 35 U.S.C. 154(b) by 0 days.

(21) Appl. No.: 14/461,350

(22) Filed: Aug. 15, 2014

(65) Prior Publication Data

US 2015/0075444 A1      Mar. 19, 2015

Related U.S. Application Data

(60) Provisional application No. 61/866,839, filed on Aug. 16, 2013.

(51) Int. Cl.
*A01K 15/02* (2006.01)

(52) U.S. Cl.
CPC ................................. *A01K 15/025* (2013.01)

(58) Field of Classification Search
CPC .... A01K 15/025; A01K 15/026; A01K 15/02
USPC .................. 119/707, 709–711; 5/409; 446/75
See application file for complete search history.

(56) References Cited

U.S. PATENT DOCUMENTS

| | | | |
|---|---|---|---|
| 4,742,799 A | 5/1988 | Schlitz | |
| 5,010,843 A * | 4/1991 | Henry | 119/28.5 |
| 6,470,830 B2 | 10/2002 | Mann | |
| 7,806,086 B2 | 10/2010 | Ottosson | |
| 8,316,804 B2 | 11/2012 | Ottosson | |
| 2001/0047770 A1* | 12/2001 | Pontes | 119/707 |
| 2006/0185617 A1* | 8/2006 | Kenny | 119/707 |
| 2007/0028852 A1* | 2/2007 | Ciciora | 119/709 |
| 2010/0275855 A1* | 11/2010 | Ottosson | 119/707 |
| 2013/0255592 A1* | 10/2013 | Foley | 119/709 |

\* cited by examiner

*Primary Examiner* — David Parsley
*Assistant Examiner* — Magdalena Topolski
(74) *Attorney, Agent, or Firm* — Kammer Browning PLLC

(57) ABSTRACT

A pet toy device and method therefore to mentally and physically exercise and entertain pets that live indoors that may include a fabric material with at least one pocket, at least one non-pocketed area and a tether with an attaching mechanism or member that temporarily attaches to a pet's favorite object. The method of using the device includes attaching a pet's favorite object to the tether using the toy holding mechanism such as a double sided single hook and loop or Velcro strap, then hiding the tethered pet object in at least one of the pockets. Once provided to the pet, the pet digs through the device to uncover the pet's favorite object. Moreover, the design provides for a pet's physical exercise, mental stimulation and entertainment while not allowing the attached favorite object to be lost under furniture or to be thrown across the room by the pet.

5 Claims, 3 Drawing Sheets

PET TOY DEVICE AND METHOD THEREFOR

CROSS-REFERENCE TO RELATED APPLICATIONS

This application claims the benefit of Provisional Patent Application No. 61,866,839 filed 2013 Aug. 16 by the present inventor.

FEDERALLY SPONSORED RESEARCH

Not Applicable

SEQUENCE LISTING OR PROGRAM

Not Applicable

DESCRIPTION

BACKGROUND OF THE INVENTION

1. Field of Invention

This invention relates to a pet toy which may include a body structure that has pocketed areas, possibly a non-pocketed area and an attached tether, providing openings to hide and retrieve an object that is attached to a tether.

2. Prior Art

Currently most indoor dogs are not getting enough exercise. This can be seen by the growing concerns of pet obesity. Many pet owners lead busy lives and are tired when they get home and as a result, many dogs do not go on walks or the walks are too short. When dogs don't go on walks or the walks are too short, dogs can be considered high energy or become over weight. Many high energy dogs are re-homed for having too much energy and overweight dogs become unhealthy. Many toys such as a ball or stuffed animal are used to exercise and entertain indoor dogs. The problems with such toys are they often end up under furniture which the pet owner must retrieve or dogs shake the toys until the toy slips out of the dog's mouth and goes flying through the air risking knocking items over such as a drink causing spills or damage to the knocked over item. Pet owners need an indoor exercise solution that's a fun game that keeps dogs engaged that is safe and nondestructive for the modern home. Dogs in the wild use digging as a natural form of exercise. Digging is a natural instinct that carries over to domestic dogs. One under developed need in the pet industry is digging toys that allow indoor dogs an opportunity to satisfy their natural urge to dig while gaining the benefit of physical exercise, mental stimulation and entertainment.

It has been identified that many pets, more specifically indoor dogs, are not getting the exercise and mental stimulation they need. To address this growing problem several prior art devices have been developed. This can be seen in the recent developments of pet games. An example of a prior art related to pet games is presented in U.S. Pat. No. 8,316,804 issued Nov. 27, 2012 to Nina Ottosson. Examples of prior art related to hiding and retrieving of objects is presented in U.S. Pat. No. 7,806,086 published Oct. 5, 2010 to Nina Ottosson; and U.S. Pat. No. US20010047770 published Dec 6, 2001 to Regina M. Pontes. Such games while providing mental stimuli also encourage the use of snacks to be hidden in the games which further contributes to pet obesity. The size of the toy also presents the disadvantage that only minimal physical movement is required for the pet to retrieve the hidden object usually being a food item. Another disadvantage is when dogs do not properly play the game instead of uncovering the treats dogs have been known to pick up the board game and flip it over or shake the treats out of the cloth games to gain access to all the treats at once.

Example of prior art applicable to inserting and removing of objects for a pet are presented in U.S. Pat. No. 8,316,804 published Nov. 27, 2012 to Nina Ottosson; U.S. Pat. No. 7,806,086 published Oct. 5, 2010 to Nina Ottosson; U.S. Pat. No. 20010047770 published Dec. 6, 2001 to Regina M. Pontes; U.S. Pat. No. 4,742,799 published May 10, 1988 to Marjorie G. Schlitz; U.S. Pat. No. 4,742,799 published May 10, 1988 to Marjorie G. Schlitz; and U.S. Pat. No. 6,470,830 published Oct. 29, 2002 to Charles D. Mann;

SUMMARY

In accordance with the present invention, a pet toy with a flexible body possibly made of fabric material which may include a pocketed and a non-pocketed area and an attached tether. The benefits of the present invention are many. When dogs were tested, surprising results were achieved such as all the dogs played with the device until heavy panting exercise was achieved and they were tired which took much less time than a game such as indoor fetch. After playing with the new invention, positive behavior was observed. Most dogs carried the toy around like a security blanket after they were done playing and many dogs chose to take the toy to their sleeping area to sleep with it. Dogs seem to really appreciate being able to release their extra energy through digging and cherish the toy. Most dogs tested play with the toy on a daily basis independent of the owners help. The present invention also applies to cats and possibly to other domestic pets.

The success of the new toy can be partially contributed to the large size in comparison to other toys of this type. The large flexible design requires pets to work harder to get their favorite object out the toy. Simple shaking is not enough to dislodge the pet's favorite object. The fabric material is also safe to use on all types of floors in modern homes without the risk of scratching and damaging floors. Since dogs stay in the area where the device is placed, only a small area is needed which is a benefit for those who live in apartments or homes without much play space available. Yet another surprising find during testing was when an object that dogs normally destroy quickly such as a stuffed toy is placed in the present invention pet toy, the dogs were so focused on getting the stuffed object out of the new pet toy that they didn't tear up the stuffed object once it was retrieved which is how the new pet toy can extend the life of pet objects that are normally quickly destroyed.

The unique design of the tether offers many benefits such as when a dog's favorite object is attached to the tether, the dog can shake the tethered object and it will not fly across the room if it slips out of the dog's mouth. Another benefit of the tether is if the attached object were to go under furniture or find its way into a hard to reach space then it is easily retrieved often times by the pet without the assistance of the pet's owner. Since the pet's favorite object is temporarily attached, many different shape and size toys can be used with the tether keeping the game exciting. Also, the pet's favorite object can be easily removed and played with the way it was originally designed.

Other features and advantages of the invention will become apparent from a review of he drawings taken in conjunction with the detailed description of the embodiments.

BRIEF DESCRIPTION OF THE DRAWINGS

A better understanding of the present invention may be had by reference to the drawing figures wherein.

DETAILED DESCRIPTION OF THE EMBODIMENTS

Figure 1:
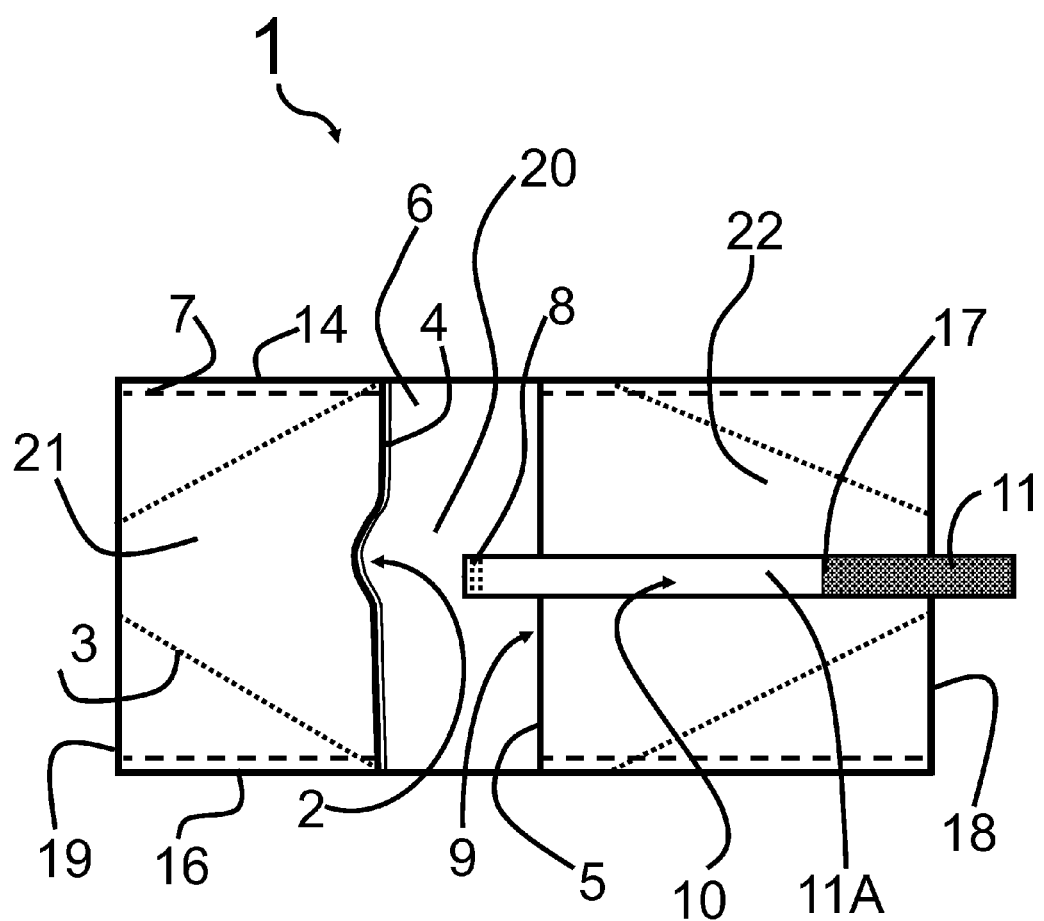
FIG. 1 shows a top view according to the present invention
Figure 2:
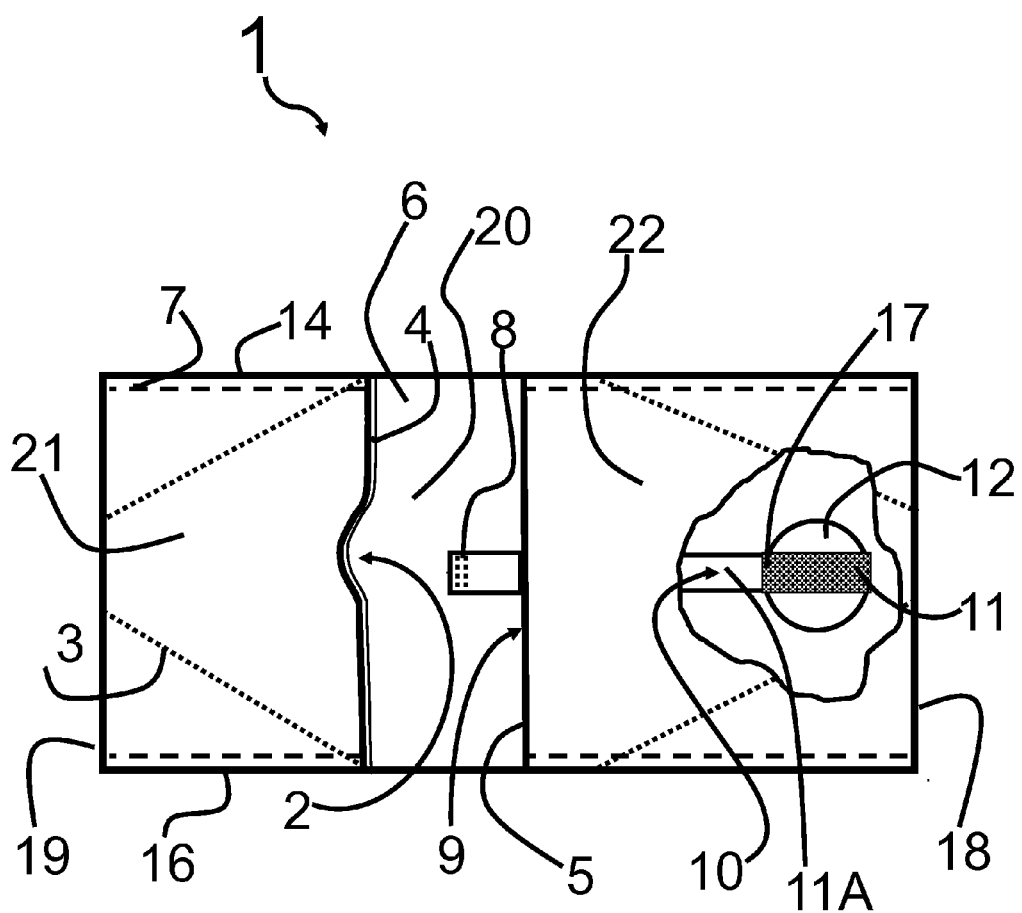
FIG. 2 shows a partially broken top view according to the present invention

Description—First Embodiment—FIG. 1 and FIG. 2

FIG. 1 shows a top view of the present invention pet toy. In the first embodiment, the fabric, or other flexible sheet like material, is used and configured to the general shape of a rectangle, or other geometric shape, 1 including a lower fabric panel 20 and upper fabric panels 21 and 22. Upper Fabric panel 21 is affixed to the lower fabric panel 20 by possibly a fold or stitch along the edge 19 and a hem 7 along the edges 14 and 16 where edge 4 is left unattached, thus forming a pocket 2. Likewise upper panel 22 is affixed to lower panel 20 possibly by a fold or stitch along the edge 18 and a hem 7 along the edges 14 and 16. Second pocket edge 5 is left unattached, thus forming a pocket 9. A non-pocketed area 6 is associated with panel 20 and is positioned between panels 21 and 22. In the first embodiment, the tether 10 includes 2 components, namely an elastic or non-elastic strap 11A and a self coupling strap, such as with Velcro or a hook and loop mechanism, 11. The two components 11A and 11 are affixed together at area 17. The tether 10 can be of a length that stretches from the non-pocketed area 6 to the bottom of each pocket 19 or 18 and can be attached at the non pocketed area 6 of the lower fabric panel 20 for example by stitches 8. The opposing end of the tether 10 positions the attached single double sided Velcro strap 11 at a length long enough to wrap around several different pet objects that can be easily hidden under upper fabric panels 21 and 22 and is attached possibly by stitches at area 17.

Various types of woven fabrics may be used for the pet toy 1. A polyester fleece material for product durability is the preferred material and can have any fabric print such as solid color, paw prints; the list of fabric type and print is endless. The term "fabric" is intended to broadly cover any type of cloth material or flexible sheet material. For the tether 10 is elastic 11A and 11 is a single double sided Velcro strap but may be formed of any strap type material such as rope, cord, cloth etc. and may vary in length as long as it is long enough to fit in the pockets 2 and 9. The strap 11A is intended to broadly cover any type of durable strap material 11 A and the self adhering strap 11 can be of any material(s) that can temporally attach a pet object to the tether 10 such as a single type of material or two different materials combined. The self coupling strap 11 can have a slip joint for attachment to the pet object 12.

As seen in FIG. 1 and FIG. 2, the upper fabric panel 22 is considerably larger than the upper fabric panel 21 and can vary in size and shape. This is to provide varying degrees of difficulty for the domestic pet using the pet toy 1. Further, there are stitches 3 represented by dotted lines used to prevent the pet object from getting stuck in corners. It is preferred that these optional stitches 3 be included in manufacturing for ease of use for domestic pets learning to use the device 1. It should be understood that the present invention can have multiple pockets on the front, back or any combination of front and back side of this new pet toy and are not limited by the two mentioned herein. The non-pocketed area 6 associated with panel 20 is for ease of insertion of the tethered pet object into the pockets 2 and 9 of the present invention.

In FIG. 2 the partially broken top view of the pet toy 1 shows a pet object 12, such as a ball, attached to the tether 10 by use of Velcro strap 11 and inserted into pocket 9 and thus, hidden under panel 22. The pet object 12 does not form a part of the present invention and is only shown to demonstrate how a pet object is attached and placed in a pocket. However, a pet object 12 may be included with the present invention, upon marketing, as a starter object so play can begin when opened from the package.

Figure 3:
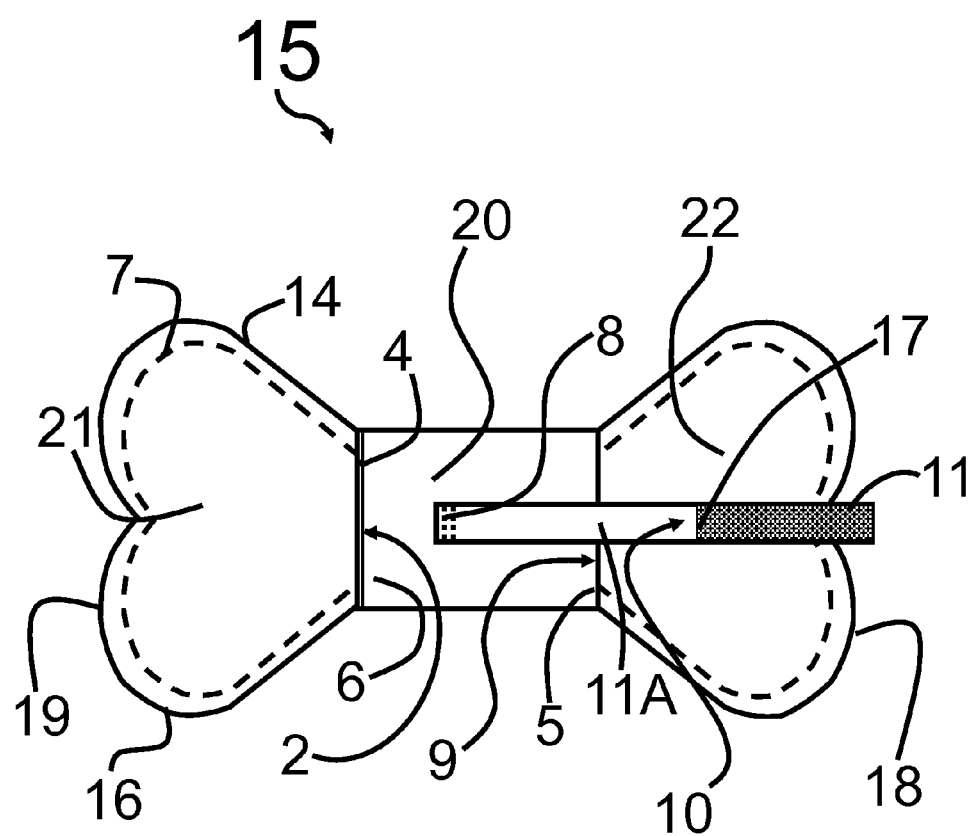
FIG. 3 shows a top view of another embodiment

Description—Second Embodiment—FIG. 3

FIG. 3 shows a top view of the second embodiment which depicts a pet toy 15 demonstrating how essentially the same components of the first embodiment can be reconfigured to form an additional embodiment of a different configuration. In a similar manner, the pet toy 15 may be manufactured in various forms, shapes and characters such as a bone (shown). These variations could have one or multiple pockets arranged in varying orientations, combinations and configurations, with respect to each other. In the case such as a Teddy bear shape (not shown) of the second embodiment, the pockets could be formed in its arms, legs and head and further, they could be located on its upper or under side or both sides.

Operation—Method of Use of the Embodiments

Before describing the actual operation of the embodiments, the major function of the embodiments will be briefly mentioned.

The function of the first and second embodiments is to (1) provide exercise to indoor pets equal to an aerobic workout, (2) mentally stimulate pets and (3) entertain pets with minimal interaction with the pet's owner. Even though pet snacks can be used with this new pet toy, it is highly recommended that pet object 12 not be a pet snack to gain the benefit of good health.

The method of use for the new pet toys 1 and 15 is to attach a pet object 12 such as a ball to the tether's 10 Velcro strap 11 by placing the Velcro strap 11 to the outside of the pet object 12, then turning the pet object in such a way that the strap's 11 loop (female) side lines up with its corresponding hook (male) side and continue attaching the Velcro strap 11 until it reaches the tether 10 at area 17. Then, place the tethered pet object 12 into either pocket 9 or 2. Once the object 12 has been placed in either pocket 9 or 2, the remaining fabric panels 20, 21 and/or 22 can be wrapped around the pocketed object 12 or simply placed on the floor so the pet can retrieve the pet object 12 by sniffing, digging and shaking the pet toy. Multiple difficulty levels are achieved by placing the tethered object 12 in different sized pockets 2 or 9. To further challenge a pet, a harder level can be reached by placing the tethered object 12 in say the pocket 9 then placing pocket 9 in the opposing pocket 2. To even further challenge a pet once the tethered object 12 is in pocket 9 twisting the fabric panels 20, 21 and/or 22 before placing the pocked 9 object 12 in the opposing pocket 2. Many additional combinations can be achieved and are not limited by what is mentioned herein. Once the pet object 12 is retrieved, the pet has the option to rebury the object in the pet toy 1 and 15, as applicable, if desired. Since pets are so determined to retrieve their favorite object from the new pet toy, pets stay engaged in the game.

Additional Ramifications

Many modifications can be made to the present invention, for example: the tether 10 could be attached anywhere on the pet toys 1 and 15. A Velcro strip (not shown) or some other type of attachment member could be added to the pockets 2 and 9 to increase difficulty levels. The components of the pet toy could be attached using other attaching material or other methods instead of stitches. Additional tethers could be added along with additional pockets. The stitches 8 could be replaced with a detachable fastener such as a snap to remove the tether 10 for washing or attaching accessories such as a permanently attached pet object on a tether with a compatible snap attachment or replacing the tether.

It should be apparent to one skilled in the art that many other ramifications, variations, alterations, substitutions, modifications, and the like are readily possible. For example, sizes, shapes, materials, assembly, design, etc. of all parts can be readily modified or changed.

Accordingly, the scope and meaning should be determined not only by the embodiments illustrated, but by the appended claims and their legal equivalents.

I claim:

1. A device for use with a pet and a pet toy object, the device comprising:
    a lower sheet of flexible material having a generally rectangular shape and a surface area,
    a first upper sheet of flexible material having a generally rectangular shape and a surface area smaller than that of said lower sheet, said first upper sheet being joined on three side edges thereof to said lower sheet to form a first pocket, said first pocket having a single opening oriented in a first direction, said first pocket being dimensioned to receive the pet toy object, said first pocket defining a generally rectangular interior pocket area with two interior right angle corners, said first upper sheet further joined to said lower sheet along lines diagonally across said two interior right angle corners to prevent the pet toy object from becoming lodged within said interior right angle corners,
    a second upper sheet of flexible material having a generally rectangular shape and a surface area smaller than that of said first upper sheet, said second upper sheet being joined on three side edges thereof to said lower sheet to form a second pocket, said second pocket having a single opening oriented in a second direction generally opposing said first direction, said second pocket being dimensioned to receive the pet toy object, and in combination with the pet toy object, to be received into the first pocket, said second pocket defining a generally rectangular interior pocket area with two interior right angle corners, said second upper sheet further joined to said lower sheet along lines diagonally across said two interior right angle corners to prevent the pet toy object from becoming lodged within said interior right angle corners, and
    at least one tether being of a strap configuration having a proximal portion and a distal portion, said proximal portion being attached to one of said lower sheet, said first upper sheet, and said second upper sheet, said distal portion being configured for removable attachment to the pet toy object,
    whereby, the pet toy object can be hid in said first or second pocket, or in said second pocket within said first pocket, for retrieval by the pet thereby providing a source of entertainment for the pet while at the same time exercising the pet both mentally and physically.

2. The device of claim 1 wherein said distal portion incorporates a hook and loop fastener for attachment to the pet object.

3. The device of claim 1 wherein said proximal portion is removably attached to one of said lower sheet, said first upper sheet, and said second upper sheet.

4. The device of claim 1 wherein said distal portion incorporates a slip joint for attachment to the pet object.

5. The device of claim 1 wherein said proximal portion is resilient.

* * * * *